(12) United States Patent  
Rahe et al.

(10) Patent No.: US 9,205,743 B2
(45) Date of Patent: Dec. 8, 2015

(54) DISPLAY DEVICE FOR A MOTOR VEHICLE (75) Inventors: Christian Rahe, Ibbenbuehren (DE); Herve Serges Fotso Fotso, Frankfurt am Main (DE); Stefan Lux, Meine (DE); Stefan Goβ, Hildesheim (DE)

(73) Assignee: VOLKSWAGEN AG, Wolfsburg (DE)

( * ) Notice: Subject to any disclaimer, the term of this patent is extended or adjusted under 35 U.S.C. 154(b) by 1771 days.

(21) Appl. No.: 11/629,252

(22) PCT Filed: May 31, 2005

(86) PCT No.: PCT/EP2005/005827
§ 371 (c)(1),
(2), (4) Date: Sep. 2, 2008

(87) PCT Pub. No.: WO2005/120880
PCT Pub. Date: Dec. 22, 2005

(65) Prior Publication Data
US 2009/0015395 A1   Jan. 15, 2009

(30) Foreign Application Priority Data
Jun. 11, 2004   (DE) .......................... 10 2004 028 481

(51) Int. Cl.
*B60Q 1/00*  (2006.01)
*B60K 35/00*  (2006.01)
*B60K 37/02*  (2006.01)

(52) U.S. Cl.
CPC ............... *B60K 35/00* (2013.01); *B60K 37/02* (2013.01); *B60K 2350/1072* (2013.01); *B60K 2350/2095* (2013.01)

(58) Field of Classification Search
CPC ................................... B60K 1/00; H05K 1/00
USPC .......................... 340/461, 438, 439
See application file for complete search history.

(56) References Cited

U.S. PATENT DOCUMENTS

| 4,787,040 A | 11/1988 | Ames et al. |
| 5,757,268 A | 5/1998 | Toffolo et al. |
| 5,764,139 A * | 6/1998 | Nojima et al. ................ 340/461 |
| 6,433,701 B1 | 8/2002 | Simon et al. |
| 6,646,622 B1 | 11/2003 | Kronenberg et al. |
| 6,795,040 B2 | 9/2004 | Kanamori |
| 2004/0080484 A1* | 4/2004 | Heines et al. ................ 345/108 |
| 2009/0015395 A1 | 1/2009 | Rahe et al. |
| 2009/0121304 A1 | 5/2009 | Terada |

FOREIGN PATENT DOCUMENTS

| DE | 198 19 821 | 9/1999 |
| DE | 198 19 393 | 11/1999 |

(Continued)

OTHER PUBLICATIONS

International Search Report, PCT International Patent Application No. PCT/EP2005/005827, dated Aug. 31, 2005.

(Continued)

*Primary Examiner* — Shirley Lu
(74) *Attorney, Agent, or Firm* — Kenyon & Kenyon LLP (57) ABSTRACT

A display device for a motor vehicle includes a display control for generating a first image signal, an image multiplexer for combining the first image signal with a second image signal and for outputting a mixed image signal, and a screen for representing an image depending on the mixed image signal.

20 Claims, 5 Drawing Sheets

(56) References Cited

FOREIGN PATENT DOCUMENTS

| | | |
|---|---|---|
| DE | 198 19 822 | 11/1999 |
| DE | 199 41 352 | 3/2001 |
| DE | 199 43 571 | 3/2001 |
| DE | 696 13 653 | 5/2002 |
| DE | 102 12 600 | 10/2002 |
| EP | 0 272 877 | 6/1988 |
| EP | 0 771 686 | 5/1997 |
| EP | 0 928 254 | 7/1999 |
| EP | 1 080 976 | 3/2001 |
| EP | 1 758 757 | 3/2007 |
| JP | 2000-168397 | 6/2000 |
| JP | 2002-046505 | 2/2002 |
| JP | 2009-123848 | 6/2009 |

OTHER PUBLICATIONS

Written Opinion of the International Searching Authority, PCT International Patent Application No. PCT/EP2005/005827, dated Aug. 31, 2005 (translation provided).

* cited by examiner

DISPLAY DEVICE FOR A MOTOR VEHICLE

FIELD OF THE INVENTION

The present invention relates to a display device for a motor vehicle, the device including an instrument cluster, for example.

BACKGROUND INFORMATION

An instrument cluster having a rigid printed circuit board situated on the back of a base element is described in German Published Patent Application No. 199 43 571. This base element is partly covered on the front by a supporting body, which is connected in an articulated manner to the base element. A flexible printed circuit board extends over the front of the base element and the supporting body, enclosing a defined angle to an edge region of a connection area hinged to the rigid circuit board, which is connected to this printed circuit board by bow-type soldering, for example.

Described in German Published Patent Application No. 199 41 352 is an instrument cluster with a base element divided into display fields, which are aligned at different angles to each other. Situated on the front of the base element is an additional circuit board, which extends over several display fields. It is made up of rigid circuit board parts, which have flexible connection areas including conductor paths in the transitional region of the display fields.

An integrated instrument cluster for display of different measuring data in a motor vehicle is described in German Published Patent Application No. 198 19 822, which is equipped with analog and digital display instruments. The integrated instrument cluster includes a device to control the display instruments and to execute one or a plurality of additional functions of the vehicle central electronic system and vehicle power electronics, and at least one integrated security device for the system.

An instrument cluster for display of different measuring data in a motor vehicle is described in German Published Patent Application No. 198 19 821, which is equipped with analog and digital display instruments, in which mechanical, optical and electrical components of the display elements are mounted on a circuit support device, and the electronic control of the display instruments is implemented via an electronics module that can be mounted on the circuit support device. The circuit support device has a wiring film, which can be stretched between a rear cover and a front cover.

An instrument cluster for display of different measuring data in a motor vehicle is also described in German Published Patent Application No. 198 19 393, which is equipped with analog and digital display instruments, in which mechanical, optical and electrical components of the display elements are mounted on a support plate, and the electronic control of the display instruments is implemented via an electronics module that can be mounted on the support plate. However, a circuit support device to support the wiring of the electrical components is mounted on the support plate.

Another display device for a motor vehicle is European Published Patent Application No. 0 272 877, for example.

SUMMARY

Example embodiments of the present invention may provide a display device, e.g., one including an instrument cluster, for a motor vehicle, and which may be produced more inexpensively, for example.

A display device for a motor vehicle may include an instrument cluster, e.g., the display device having a display control to generate a first image signal, an image multiplexer to combine the first image signal with a second image signal and to output a mixed image signal (including at least one component of the first image signal and/or the second image signal), as well as a monitor to display an image as a function of the mixed image signal. The display control and the image multiplexer may be situated in a housing, e.g., in a housing to accommodate the monitor as well as an electromechanical display, for instance.

Using the image multiplexer, the first image signal may be able to be prioritized with respect to the second image signal. Using the image multiplexer, the first image signal may be prioritizable with respect to the second image signal so that the mixed image signal is formed such that an image corresponding to the second image signal is imaged on a region of the monitor only if the first image signal has no image component for this region. To this end, the monitor may be subdivided into segments, e.g., virtual segments. In this instance, the mixed image signal may be formed such that in one segment, e.g., a virtual segment, of the monitor, an image corresponding to the second image signal is imaged only if the first image signal has no image component for this segment, e.g., virtual segment.

The display device may include an image-input interface, such as a video interface, e.g., a DVI interface (digital video interface), or an RGB interface or an LVDS data interface for reading in the second image signal, etc.

The display device may include a control-signal interface such as a CAN-bus interface, to read in a control signal.

The first image signal may be able to be generated by the display control as a function of the control signal.

The display device may include an electromechanical display which may be able to be controlled by the display control as a function of the control signal.

A display device for a motor vehicle may include a cluster instrument, e.g., and a display control to generate a first image signal, as well as an image-input interface to read in a second image signal.

A motor vehicle may include a display device, e.g., one having the aforementioned features. The control signal may include the velocity of the motor vehicle and/or the rotational speed of an engine of the motor vehicle.

The control signal may include (among others) a temperature of an engine coolant, an oil pressure of the motor vehicle, a fill level of a tank of the motor vehicle, an instantaneous and/or average fuel consumption of the motor vehicle, a driven distance, an average driving speed, an ABS warning signal, a closing status of a door of the motor vehicle, a status of a parking brake, a status of a safety belt, a status of an airbag and/or a signal of a driver-assistance system, etc.

The motor vehicle may include an infotainment system having an image-output interface, the image-output interface being connected to the image-input interface via a data link. The second image signal may be able to be generated by the infotainment system.

It may be provided that the second image signal is able to include, or may include (depending on the operator's preference, for instance), an image signal to display information of a navigation system, a radio, a DVD player, a CD player, a telephone, a TV module and/or an air-condition system, etc.

The motor vehicle includes, or may include (depending on the operator's preferences), a rearview camera, which is connected to the image-input interface or the infotainment system via a data link, the second image signal including a video signal able to be generated by the rearview camera.

A control signal may include various control signal components transmitted in parallel, such as the speed of the motor vehicle, the engine speed of the motor vehicle, the temperature of the engine coolant, the oil pressure of the motor vehicle, the fill level of the tank of the motor vehicle, the instantaneous and/or average fuel consumption of the motor vehicle, the traveled distance, the average driving speed, the ABS warning signal, the closing status of a door of the motor vehicle, the status of the parking brake, the status of the safety belt, the status of the airbag and/or the signal of a driver-assistance system, etc. Different control signal components may also be transmitted in series, for instance according to the CAN bus protocol.

A motor vehicle may be, in particular, a land vehicle that may be used individually in road traffic. Motor vehicles are specifically not restricted to land vehicles having an internal combustion engine.

Further aspects and details of exemplary embodiments of the present invention are described in more detail below with reference to the appended Figures.

DETAILED DESCRIPTION

Figure 1:
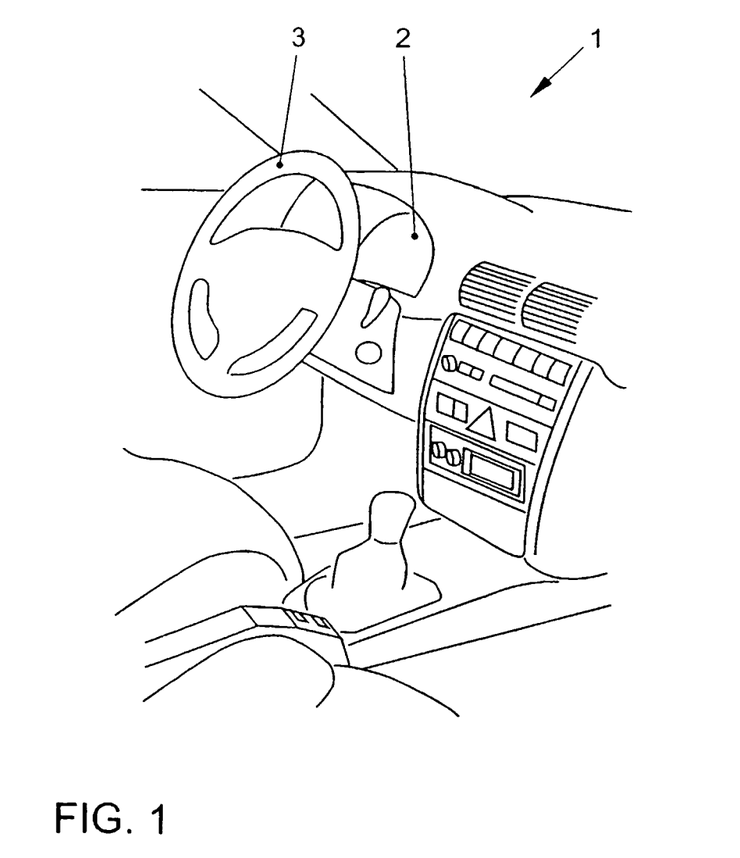
FIG. 1 is an internal view of a motor vehicle.
Figure 2:
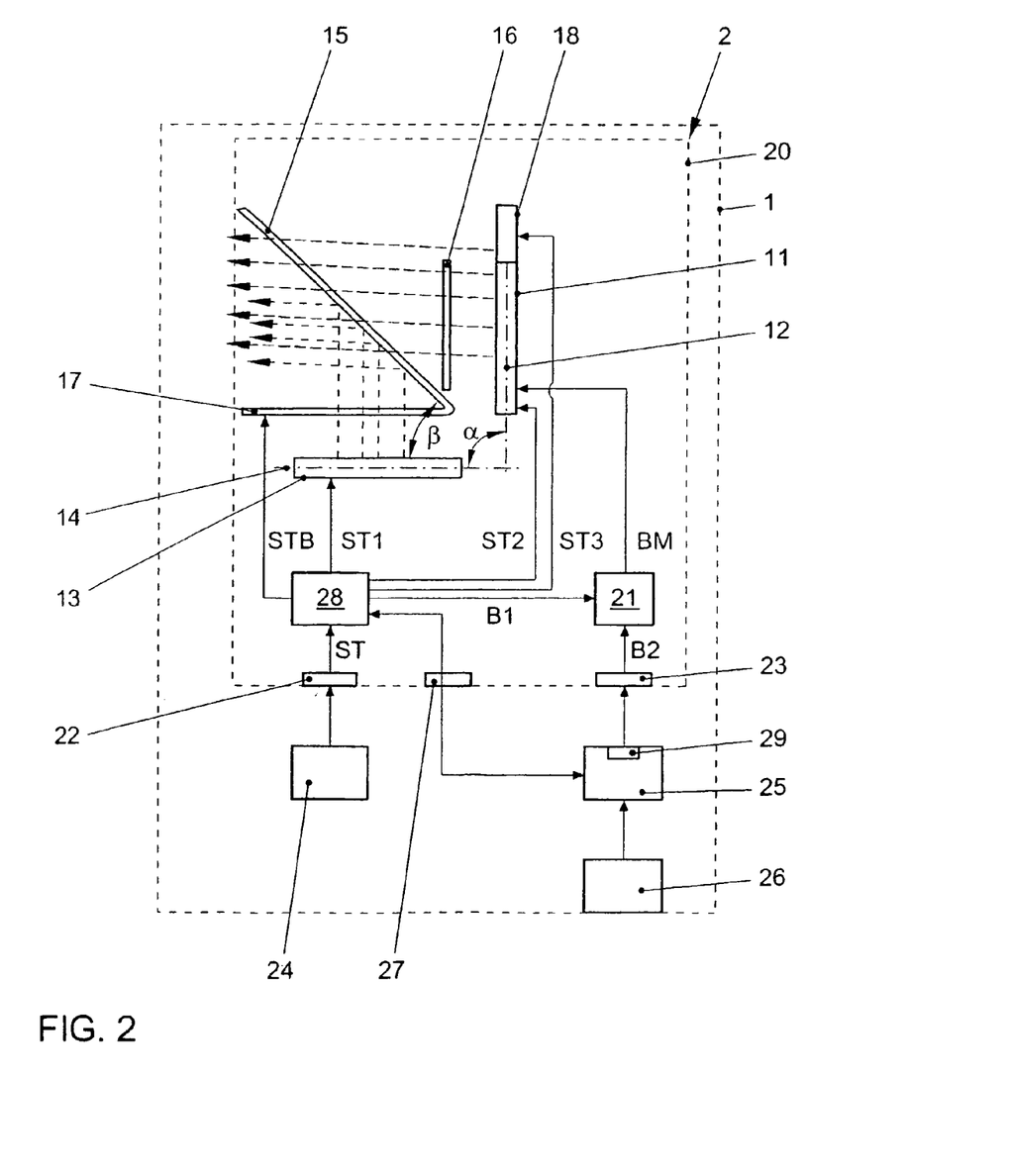
FIG. 2 is a basic representation of a motor vehicle having a display device.

FIG. 1 is an interior view of a motor vehicle 1 having a display device 2 situated behind a steering wheel 3. FIG. 2 is a basic representation of motor vehicle 1 having display device 2. Display device 2 has an LCD monitor 11 to display an image as a function of a mixed image signal BM, as well as an electromechanical display 13 having analog pointers, for instance, which is able to be controlled by a display control 28 as a function of a control signal ST able to be generated by, for instance, a control 24 of the motor vehicle and read in via a control-signal interface 22 such as a CAN bus interface. To this end, display control 28 generates a first display control signal ST1, which may be a voltage for moving an analog pointer to display the speed of the motor vehicle, or a voltage for moving an analog pointer to display the rotational speed of an engine of the motor vehicle. LCD monitor 11 is able to be turned on or off with the aid of a second control signal ST2 able to be generated by display control 28.

Control signal ST may include the speed of the motor vehicle, the rotational speed of the engine of the motor vehicle, a temperature of an engine coolant, an oil pressure of the motor vehicle, a fill level of a tank of the motor vehicle, an instantaneous and/or an average fuel consumption of the motor vehicle, a driven distance, an average travel speed, an ABS warning signal, a closing status of a door of the motor vehicle, a status of a parking brake, a status of a safety belt, a status of an airbag and/or a signal of a driver-assistance system, etc.

Furthermore, display device 2 includes a warning display 18 as visual alarm. It is possible to display warnings regarding an excessive temperature of the engine coolant, insufficient oil pressure of the motor vehicle, a defect of the ABS, an open door of the motor vehicle, a not fully deactivated parking brake, an unlatched safety belt, or a deactivated airbag, etc.

The individual components of warning display 18 are able to be activated and deactivated with the aid of a third control signal ST3 able to be generated by display control 28.

Center axes 12 and 14 of LCD monitor 11 and electromechanical display 13 may be positioned at an angle $\alpha$ of 90° with respect to one another. Provided at an angle $\beta$ of 45° from electromechanical display device 13 is a combiner 5. This may be a planar, semitransparent mirror 15, which is designed to transmit the image-forming light of LCD monitor 11, so that an observer perceives the display image of LCD monitor 11 and warning display 18 directly. The image-forming light of electromechanical display 13 is reflected by semitransparent mirror 15, so that it appears to an observer as a virtual image 16 superposed to monitor 11. A diaphragm 17 may be provided above electromechanical display 13 by which portions of electromechanical display 13 are able to be covered as a function of a diaphragm-control signal STB.

Using display device 28, a first image signal B1 is able to be generated, for instance, to display the temperature of the engine coolant, the oil pressure of the motor vehicle, the fill level of the tank of the motor vehicle, the instantaneous and/or the average fuel consumption of the motor vehicle, the traveled distance, the average travel speed, the ABS warning signal, the closing status of the doors of the motor vehicle, the status of the parking brake and/or the displays of a driver-assistance system, etc., as a function of control signal ST.

Display device 2 also includes an image multiplexer 21 to combine first image signal B1 with a second image signal B2 able to be read in via an image-input interface 23 designed as RGB interface, and to output mixed image signal BM. Display control 28 and image multiplexer 21 may be situated in a housing 20 to accommodate LCD monitor 11 and electromechanical display 13.

Using multiplexer 21, first image signal B1 may be able to be prioritized with respect to second image signal B2. Using the image multiplexer, first image signal B1 may be prioritizable with respect to second image signal B2 so that mixed image signal BM is formed such that an image corresponding to second image signal B2 is imaged on a region of LCD monitor 11 only if first image signal B1 has no image component for this region. To this end, LCD monitor 11 may be subdivided into segments, for example, in particular virtual segments. In this instance, mixed image signal BM is formed such that in one segment, e.g., a virtual segment, of LCD monitor 11 an image corresponding to second image signal B2 is imaged only if first image signal B1 has no image component for this segment, e.g., virtual segment.

Furthermore, motor vehicle 1 has an infotainment system 25 by which second image signal B2 is output via an image-output interface 29 which is connected to image-input interface 23 via a data link. It may be provided that second image signal B2 includes, or may include (depending to an operator's wishes), for instance, an image signal to display information of, for instance, a navigation system assigned to infotainment system 25, a radio assigned to, for instance, infotainment system 25, a DVD player assigned to, for instance, infotainment system 25, a CD player assigned to, for instance, infotainment system 25, a telephone assigned to, for instance, infotainment system 25, a TV module assigned to, for instance, infotainment system 25, and/or a climate control system assigned to, for instance, infotainment system 25.

The motor vehicle may include a rearview camera, which is connected to the image-input interface or the infotainment system via a data link, the second image signal including a video signal able to be generated by the rearview camera or able to include such (depending on the operator's preferences).

Figure 3:
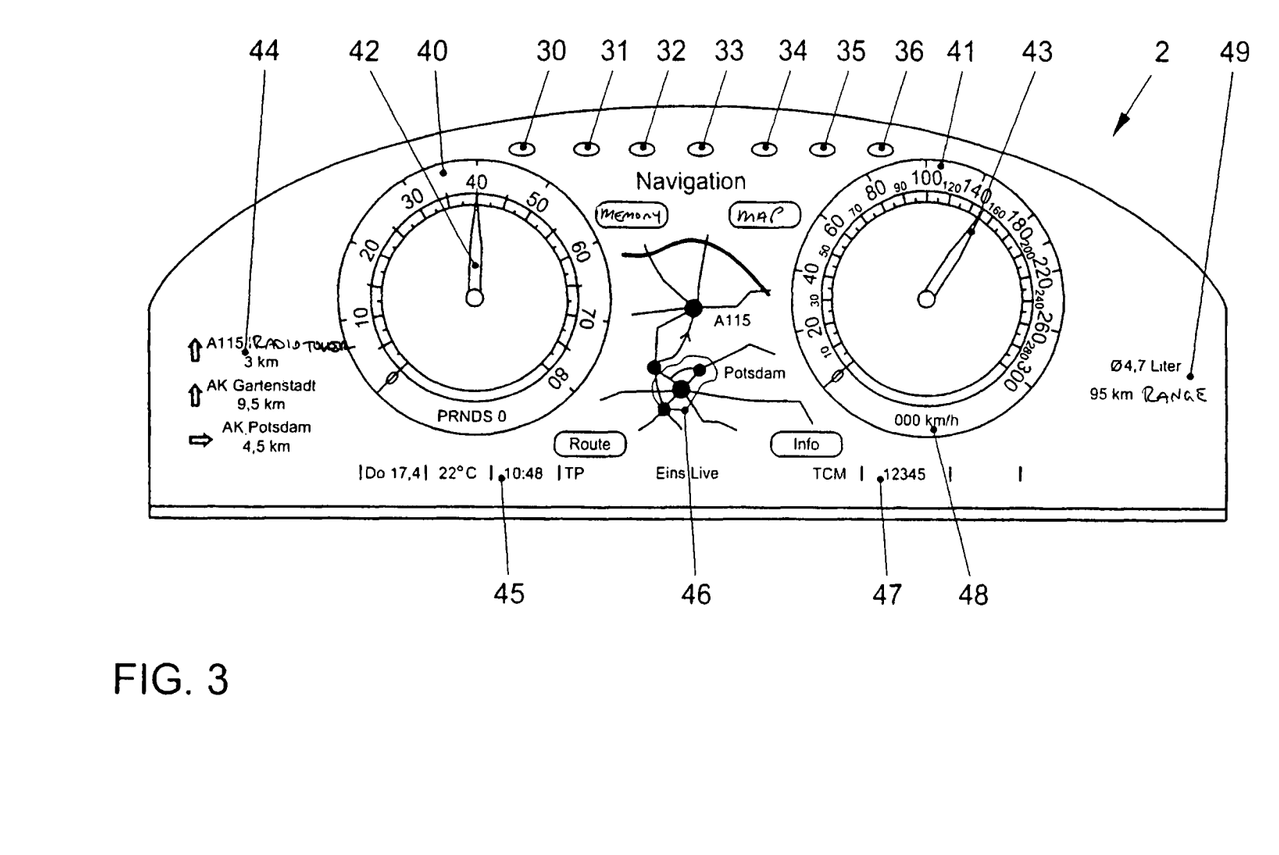
FIG. 3 is a view of the display device illustrated in FIG. 2.
Figure 4:
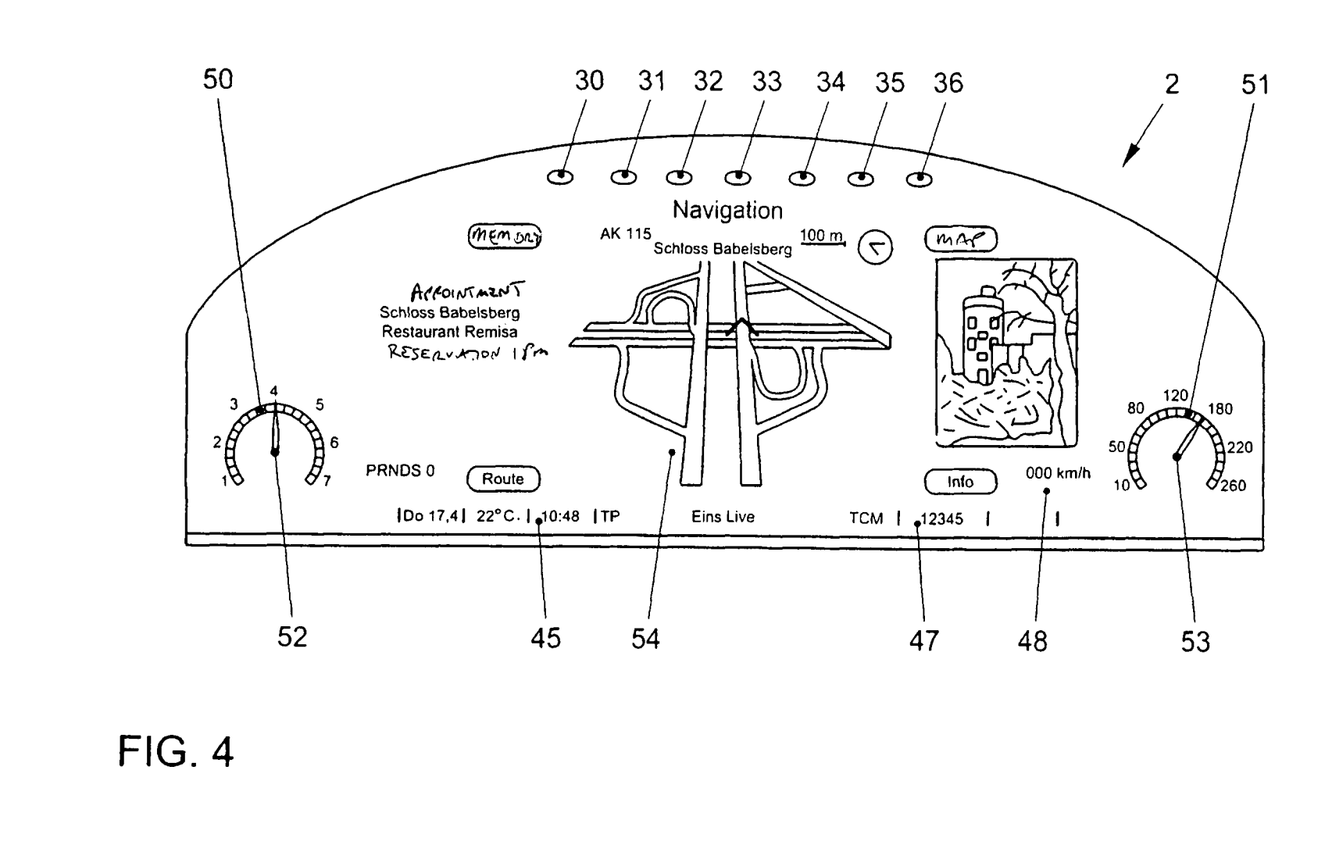
FIG. 4 is another view of the display device illustrated in FIG. 2.
Figure 5:
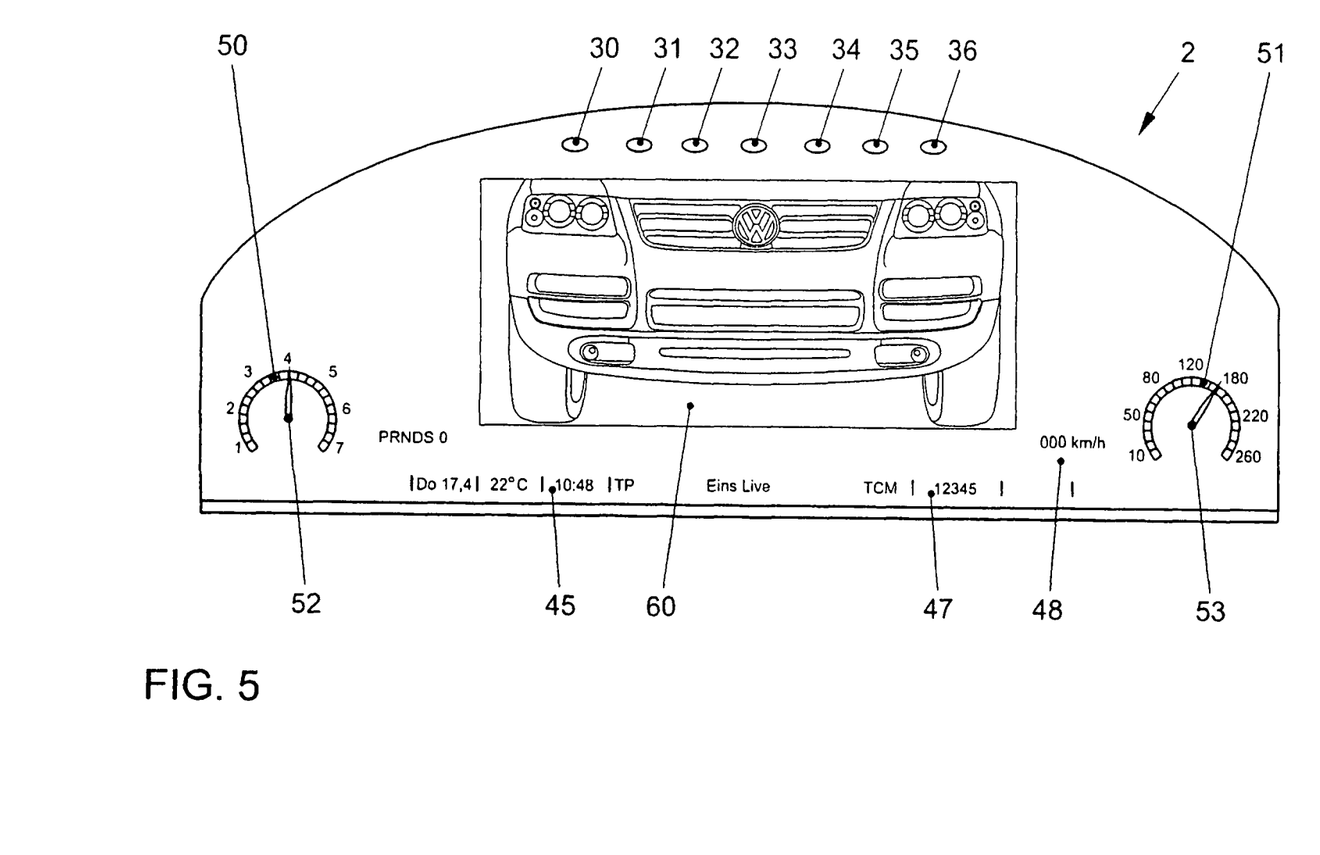
FIG. 5 is another view of the display device illustrated in FIG. 2.

FIG. 3, FIG. 4 and FIG. 5 show an exemplary embodiment for a view of display device 2 illustrated in FIG. 2. Reference numerals 30, 31, 32, 33, 34, 35 and 36 denote individual components of warning indicator 18, which are able to be turned on or off by third control signal ST3 able to be generated by display control 28. Reference numerals 42, 43, 52 and 53 denote (actual) pointers implemented on electromechanical display 13. In the view illustrated in FIG. 3, pointers 52 and 53 are covered by diaphragm 17, and in the view illustrated in FIG. 4 and FIG. 5, pointers 42 and 43 are covered by diaphragm 17. Reference numerals 40, 41, 50 and 51 denote scales assigned to pointers 42, 43, 52 and 53. Scales 40, 41, 50 and 51 may be implemented as a component of electromechanical display 13. The scales may be displayed on LCD monitor 11 as component of first image signal B1.

Reference numeral 45 denotes a segment in which a chronological time is shown in the views illustrated in FIG. 3, FIG. 4 and FIG. 5. Reference numeral 47 denotes a segment in which an odometer is displayed in the views illustrated in FIG. 3, FIG. 4 and FIG. 5, and reference numeral 48 denotes a segment in which a daily odometer is displayed in the views illustrated in FIG. 3, FIG. 4 and FIG. 5. Reference numeral 49 denotes a segment in which an average fuel consumption and a range are displayed in the view illustrated in FIG. 3. The time, the odometer, the daily odometer, the average fuel consumption, and the range are components of first image signal B1.

Reference numerals 44 and 46 in the view illustrated in FIG. 3, and reference numeral 54 in the view illustrated in FIG. 4 denote navigation information, which is displayed on LCD monitor 11 and is part of second image signal B2. So that a display corresponding to the view illustrated in FIG. 4 is allowed by image multiplexer 21, first image signal B1 is correspondingly limited by display control 28. To this end, a data exchange between display control 28 and infotainment system 25 is provided via an interface 27. For instance, infotainment system 25 is able to indicate to display control 28 which segments on LCD monitor 11 are to be utilized by infotainment system 25. Display control 28 decides whether these segments (in first image signal B1) are activated. In an analogous manner, this also applies to the display of an image 60, assigned to second image signal B2, of a rearview camera 28 as illustrated in FIG. 5.

The elements in the figures are drawn with simplicity and clarity in mind, and not necessarily to an exact scale. Thus, for example, the orders of magnitude of some elements are exaggerated as compared to other elements in order to facilitate understanding.

LIST OF REFERENCE CHARACTER 1 motor vehicle
2 display device
3 steering wheel
11 LCD monitor
12, 14 center axis
13 electromechanical display
15 semitransparent mirror
16 virtual image
17 diaphragm
18 warning indicator
20 housing
21 image multiplexer
22 control-signal interface
23 image-input interface
24 control system
25 infotainment system
26 rearview camera
27 interface
28 display control
29 image-output interface
30, 31, 32, 33, 34, 35, 36 components of a warning indicator
40, 41, 50, 51 scale
42, 43, 52, 53 pointer
44, 45, 47, 48, 49 segment
46, 54 navigation information
60 image
BM mixed image signal
B1 first image signal
B2 second image signal
ST control signal
STB diaphragm control signal
ST1 first display control signal
ST2 second display control signal
ST13 third display control signal
$\alpha, \beta$ angle

What is claimed is:

1. A display device for a motor vehicle, comprising:
   a display control which, in operation, generates a first image signal;
   an image multiplexer which, in operation, combines the first image signal with a second image signal and outputs a mixed image signal;
   a monitor which, in operation, displays an image as a function of the mixed image signal, the monitor having at least one region; and
   a control-signal interface which, in operation, reads in a control signal having a first control signal component controlling an electromechanical display, a second control signal component controlling an infotainment display, and a third control signal component controlling a warning display;
   wherein, for each of the at least one region of the monitor, an image corresponding to the second image signal is displayed if there is no image corresponding to the first image signal.

2. The display device according to claim 1, wherein the image multiplexer, in operation, prioritizes the first image signal with respect to the second image signal.

3. The display device according to claim 1, further comprising an image-input interface which, in operation, reads in the second image signal.

4. The display device according to claim 3, wherein the image-input interface includes a video interface.

5. The display device according to claim 3, wherein the image-input interface includes at least one of (a) an RGB interface, (b) an LVDS interface and/or (c) a DVI interface.

6. The display device according to claim 1, wherein the display device, in operation, generates the first image signal as a function of the control signal.

7. The display device according to claim 1, further comprising a diaphragm covering a portion of the electromechanical display, the control signal further having a diaphragm control signal component controlling the diaphragm.

8. A display device for a motor vehicle, comprising:
   a display control which, in operation, generates a first image signal;
   an image-input interface which, in operation, reads in a second image signal;
   an image multiplexer which, in operation, combines the first image signal with the second image signal and outputs a mixed image signal;

a monitor which, in operation, displays an image as a function of the mixed image signal, the monitor having at least one region; and a control-signal interface which, in operation, reads in a control signal having a first control signal component controlling an electromechanical display, a second control signal component controlling an infotainment display, and a third control signal component controlling a warning display;

wherein, for each of the at least one region of the monitor, an image corresponding to the second image signal is displayed if there is no image corresponding to the first image signal.

9. A motor vehicle, comprising:
a display device including:
a display control which, in operation, generates a first image signal;
an image multiplexer which, in operation, combines the first image signal with a second image signal and outputs a mixed image signal;
a monitor which, in operation, displays an image as a function of the mixed image signal, the monitor having at least one region; and
a control-signal interface which, in operation, reads in a control signal having a first control signal component controlling an electromechanical display, a second control signal component controlling an infotainment display, and a third control signal component controlling a warning display;
wherein, for each of the at least one region of the monitor, an image corresponding to the second image signal is displayed if there is no image corresponding to the first image signal.

10. The motor vehicle according to claim 9, the first control signal component including at least one of (a) a speed of the motor vehicle and/or (b) a rotational speed of an engine of the motor vehicle.

11. The motor vehicle according to claim 9, the third control signal component including at least one of (a) a temperature of an engine coolant, (b) an oil pressure of the motor vehicle, (c) a fill level of a tank of the motor vehicle, (d) at least one of (i) an instantaneous and/or (ii) an average fuel consumption of the motor vehicle, (e) a driven distance, (f) an average driving speed, (g) an ABS warning signal, (h) a closing status of a door of the motor vehicle, (i) a status of a parking brake, (j) a status of a safety belt, (k) a status of an airbag and/or (l) a signal of a driver-assistance system.

12. The motor vehicle according to claim 9, further comprising an infotainment system including an image-output interface connected to an image-input interface of the display device by a data link.

13. The motor vehicle according to claim 12, wherein the infotainment system, in operation, generates the second image signal.

14. The motor vehicle according to claim 9, wherein the second image signal includes an image signal displaying information of at least one of (a) a navigation system, (b) a radio, (c) a DVD player, (d) a CD player, (e) a telephone, (f) a TV module and/or (g) an air-condition system.

15. The motor vehicle according to claim 9, further comprising a rearview camera connected to at least one of (a) an image-input interface of the display device and/or (b) an infotainment system of the motor vehicle by a data link, the second image signal including a video signal generatable by the rearview camera.

16. The display device according to claim 9, further comprising a diaphragm covering a portion of the electromechanical display, the control signal further having a diaphragm control signal component controlling the diaphragm.

17. A motor vehicle, comprising:
a display device including:
a display control which, in operation, generates a first image signal;
an image-input interface which, in operation, reads in a second image signal;
an image multiplexer which, in operation, combines the first image signal with the second image signal and outputs a mixed image signal;
a monitor which, in operation, displays an image as a function of the mixed image signal, the monitor having at least one region; and
a control-signal interface which, in operation, reads in a control signal having a first control signal component controlling an electromechanical display, a second control signal component controlling an infotainment display, and a third control signal component controlling a warning display;
wherein, for each of the at least one region of the monitor, an image corresponding to the second image signal is displayed if there is no image corresponding to the first image signal.

18. A method for displaying an image on a display device for a motor vehicle, comprising:
generating, by a display control, a first image signal;
combining, by an image multiplexer, the first image signal with a second image signal
outputting, by the image multiplexer, a mixed image signal;
displaying, by a monitor, an image as a function of the mixed image signal, the monitor having at least one region; and
reading in, by a control-signal interface, a control signal having a first control signal component for controlling an electromechanical display, a second control signal component for controlling an infotainment display, and a third control signal component for controlling a warning display;
wherein, for each of the at least one region of the monitor, an image corresponding to the second image signal is displayed if there is no image corresponding to the first image signal.

19. The method of claim 18, the first control signal component including at least one of (a) a speed of the motor vehicle and/or (b) a rotational speed of an engine of the motor vehicle.

20. The method of claim 18, the third control signal component including at least one of (a) a temperature of an engine coolant, (b) an oil pressure of the motor vehicle, (c) a fill level of a tank of the motor vehicle, (d) at least one of (i) an instantaneous and/or (ii) an average fuel consumption of the motor vehicle, (e) a driven distance, (f) an average driving speed, (g) an ABS warning signal, (h) a closing status of a door of the motor vehicle, (i) a status of a parking brake, (j) a status of a safety belt, (k) a status of an airbag and/or (l) a signal of a driver-assistance system.

* * * * *